(12) United States Patent
Mongold

(10) Patent No.: US 11,716,978 B1
(45) Date of Patent: Aug. 8, 2023

(54) FISH LURE LOCK

(71) Applicant: John A. Mongold, Todd, PA (US)

(72) Inventor: John A. Mongold, Todd, PA (US)

( * ) Notice: Subject to any disclaimer, the term of this patent is extended or adjusted under 35 U.S.C. 154(b) by 260 days.

(21) Appl. No.: 16/861,126

(22) Filed: Apr. 28, 2020

Related U.S. Application Data

(60) Provisional application No. 62/839,944, filed on Apr. 29, 2019.

(51) Int. Cl.
*A01K 83/06* (2006.01)
*A01K 85/00* (2006.01)

(52) U.S. Cl.
CPC .............. *A01K 83/06* (2013.01); *A01K 85/00* (2013.01)

(58) Field of Classification Search
CPC ........ A01K 83/06; A01K 85/00; A01K 85/02; A01K 83/061; A01K 83/063; A01K 83/064; A01K 83/066; A01K 85/021; A01K 85/022; A01K 85/1811; A01K 85/1813; A01K 85/1821; A01K 85/1823; A01K 85/1831; A01K 85/1833; A01K 85/1837
USPC ........... 43/44.2, 44.4, 44.6, 44.8, 43.2, 42.4, 43/42.42, 42.39, 42.24, 42.26, 42.28, 43/42.29, 42.37, 42.38
See application file for complete search history.

(56) References Cited

U.S. PATENT DOCUMENTS

| | | | | |
|---|---|---|---|---|
| 2,785,498 A * | 3/1957 | Youngquist | ............ | A01K 83/00 43/43.4 |
| 3,640,014 A * | 2/1972 | Gurka | ..................... | A01K 85/02 43/42.43 |
| 4,126,956 A * | 11/1978 | Bayer | ..................... | A01K 83/06 43/4.5 |
| 4,349,979 A * | 9/1982 | Strantz | ................... | A01K 83/06 43/44.8 |
| 5,301,452 A * | 4/1994 | Roach | .................... | A01K 85/00 43/44.4 |
| 10,492,478 B1 * | 12/2019 | Parks | ..................... | A01K 85/00 |
| 2006/0037232 A1 * | 2/2006 | Gill | ......................... | A01K 85/00 43/44.8 |
| 2008/0236022 A1 * | 10/2008 | Harrell | ................... | A01K 85/00 43/42.42 |
| 2010/0101138 A1 * | 4/2010 | Perrick | .................. | A01K 85/00 43/42.47 |
| 2014/0215895 A1 * | 8/2014 | Zobrosky | ............... | A01K 83/06 43/44.8 |
| 2016/0113254 A1 * | 4/2016 | Scopelitis | .............. | A01K 83/06 43/44.6 |

* cited by examiner

*Primary Examiner* — Timothy D Collins
*Assistant Examiner* — Maria E Graber

(57) ABSTRACT

A live bait and artificial bait lock that can penetrate an external surface of the respective bait and releasable or repeatably secure the bait to a hook or a shaft of a hook, a barbed hook, or a fish hook.

18 Claims, 15 Drawing Sheets

FISH LURE LOCK

CROSS-REFERENCE TO RELATED APPLICATIONS

This patent application claims the benefit of U.S. Provisional Patent Application No. 62/839,944, filed Apr. 29, 2019, entitled Fish Lure Lock, which is hereby incorporated by reference in its entirety.

BACKGROUND

Plastic lures can be attached to a hook on a jig head. Securing a plastic lure on a jig head can become problematic as the lure wears over time and slides down a length of the hook.

Conventional jig heads can include a molded lead barb, a molded ring/collar, or molded metal wire hook that secures the lure to the jig head. An adhesive, such as quick drying glue, can also be used to secure the lure to the jig head. However, these approaches are only temporary fixes. The lead barb, ring or metal wire hook typically engages the lure at a smaller cross-sectional diameter of the lure, which is a weak point on the lure. Moreover, molded lead barbs, integral rings, integral metal wire hooks and adhesives do not keep the lure attached to the jig head for very long, especially when the lure is infused with salt or is made from soft plastic that is easily torn.

SUMMARY OF EMBODIMENTS

Bait, such as grubs, swimbait, creature bait or any plastic lure, can be attached to a jig hook, hook or jig head with a fish lure lock. Artificial lures in particular can be very expensive, so the longer a fisherman can use a given lure, the more money the fisherman can save. Less time is wasted gluing lures or changing lures.

Generally, the present invention can include a secondary device, such as a fish lure lock, that (i) secures the lure or bait to a jig, a jig head, or fish hook, (ii) secures the fish lure lock to a jig, a jig head or fish hook, or (iii) secures a fish lure lock to a lure or bait.

A fish lure lock can be positioned on or over a fishing line attachment, such as an eyelet, rotated or placed perpendicularly with respect to a body of a lure, and then snapped or locked into place. Locking can be done via snap or lock arms that penetrate an exterior surface of a body of a lure or other bait with features designed to easily penetrate soft, compliant, plastic, rubber or other malleable material of the lure or bait. The lock arms can include hook snap ledges or barbs that can removably secure the fish lure lock onto a shaft of a fish hook. Snap ledge or barb locations can be multiple and/or variable to allow for different diameter lures. Lock arms can be placed apart and shifted or offset at a distance that allows the fish lure lock to be rotated, so that the fish lure lock can be removed from the lure without damage and re-used.

First and second lock arms can deflect around and over a shaft of a fish hook. A compression member, such as an O-ring, can be added over the jig, jig head or fish hook and fish lure lock to help secure the fish lure lock to the jig, jig head or fish hook. An O-ring that can be elastomeric or compliant can be added over the fish lure lock and the lure to help secure the fish lure lock to the lure or bait. The fish lure lock can be devoid of holes for a weed guard or can define holes perpendicular or angled with respect to a shaft of a fish hook, wherein the holes can be configured to accept a weed guard that can be made in the field or sold as one unit. Without being bound by theory, the fish lure lock can use compressible properties of a lure to apply reactive forces to keep the fish lure lock location stable in multiple directions. The fish lure lock can be stamped and formed from metal, formed from round wire, and/or molded from any plastic material, such as a translucent material that invisible to fish. Alternatively, the fish lure lock can be colored to match the color of the lure. The compression member, such as an O-ring, can be made from a translucent material invisible to fish. The compression member, such as an O-ring, can be removably attached to at least any one, at least any two, at least any three, at least any four or all of the jig, jig head, fish hook, fish lure lock and lure or bait.

A fish lure lock can include an anchor region configured to be attached to a jig head, and at least one lock arm configured to penetrate through an exterior surface of a lure. A jig head can also be provided. The jig head can include a fishing line attachment, alone or in combination with a fish hook. The jig head can include a shaft of a fish hook. The jig head can include an O-ring, or elastic member receiving surface. The jig head can be made from metal or plastic.

The fish lure lock can include a slot and an intermediate portion. The at least one lock arm can be a first lock arm. The first lock arm can define at least one barb. The fish lure lock can further include a second lock arm. The second lock arm can define at least one barb. The at least one barb can be a convex portion or a canted end. The fish lure lock can include an anchor region, a slot defined by the anchor region, an intermediate portion positioned proximate to the anchor region, at least one opening defined by the intermediate portion, and a weed guard received in the at least one opening. The second lock arm can be offset longitudinally from the first lock arm. The fish lure lock can be formed metal wire or may be a formed metal stamping.

A fishing lure kit can include a fishing lure and a fish lure lock. The fishing lure can be made from plastic, rubber, or other elastic material. The fish lure lock can attach or repeatedly attach or removably attach the fishing lure to a fish hook. The fish lure lock can penetrate an external surface of the fishing lure. An adjustable member can releasably attach to the fish lure lock. The fish lure lock can include an anchor region configured to be attached to a jig head. The fish lure lock can include a first lock arm, wherein the first lock arm can penetrate an external surface of the fishing lure.

A jig head can include a fishing line attachment, a fish hook that includes a shaft, and a fish lure lock that can attach to the fishing line attachment and the shaft of the fish hook. The jig head can further comprise a lure attached to the jig head. The fish lure lock can penetrate through an exterior surface of the lure. The fish lure lock can include a first lock arm can penetrate an exterior surface of the lure. The fish lure lock can include a second lock arm that can penetrate an exterior surface of the lure. The first lock arm can include a barb. The first lock arm can further include a pair of barbs and a first recess positioned between the pair of barbs. The second lock arm can include a barb. The second lock arm can include a pair of barbs and a first recess positioned between the pair of barbs. The first recess can be positioned between the pair of barbs. The fish lure lock can define convex portions. The jig head can define an elastic member receiving surface. The jig head can include a stopper. The fish lure lock can define a ridge. The fish lure lock can define a trough. The fish lure lock can include upturned ends. A ledge can be defined by one of the pair of barbs. A second recess can be defined by the ledge.

A method to make fish tackle can include one or more steps of placing a lure or bait onto a jig head and securing the lure or bait on the jig head by puncturing an external surface of the lure or bait with any fish lure lock embodiment described herein.

A method to make fish tackle can include the steps of placing a lure or bait onto a hook shaft of a jig head, followed by the step of securing a fish lure lock onto the jig head and the hook shaft.

Another method includes a step of publicly advertising a fish lure lock that penetrates a lure to retain a lure or bait onto a fish hook shaft.

A fish lure lock can include a lock body. The lock body can include an anchor region that can define a slot, an extension spaced from the slot, and a first lock arm positioned on the extension. The first lock arm can be configured to penetrate through an exterior surface of a lure or bait and the slot can be configured to receive a fishing line attachment of a jig head. The first lock arm can be a pair of barbs. A second lock arm can include a pair of barbs, a first recess can be defined between the pair of barbs of the first lock arm, and a second recess can be defined by ledges of barbs of the first lock arm pair of barbs and the second lock arm pair of barbs. A fish hook shaft can be received in the first recess. An elastic member can circumscribe the fish lure lock. A weed guard can attach to the lock body. The lock body can be repeatedly attached to and removed from the shaft of a fish hook. The lock body can repeatedly pierce a lure.

A fish lure lock can include a first pair of openings for receiving a first weed guard and a second pair of openings for receiving a second weed guard. Each opening in the first pair of openings can have a first internal diameter. Each opening in the second pair of openings can have a second internal diameter that is different from the first internal diameter. At least one opening in the first pair of openings can define a retention feature defined by inner walls of the at least one opening. At least one opening in the first pair of openings can define a tapered inner diameter. The first weed guard and the second weed guard can each have different material thickness or different diameters. The first weed lock can be made from a material selected from the group of metal, wire, fishing line, filament, and plastic. A third pair of openings that each define a third internal diameter that is different from a first internal diameter and the second internal diameter. At least one opening of the first pair of openings can have an inner diameter that is not equal to an inner diameter of another opening in the first of openings. The first weed guard and the second lead guard can each have different material stiffnesses. A jig head can receive the fish lure lock. A lure can be pierced by the fish lure lock.

A fish lure lock can include a lock body that can define an anchor region, and at least one lock arm that can be configured to penetrate through an exterior surface of a lure. The anchor region can be configured to be attached to a jig head. The anchor region can define a slot, and the at least one lock arm can be positioned on an extension adjacent to the slot. The slot can be configured to receive a fishing line attachment of a jig head. The slot can be defined by the anchor region and an intermediate portion can be positioned proximate to or immediately adjacent to the anchor region. At least one opening can be defined by the intermediate portion, and at least one weed guard can received in the at least one opening.

The at least one lock arm can releasably attach to a shaft of the hook, barbed hook or fish hook. The at least one lock arm can be repeatedly attached to and removed from a shaft of a hook, barbed hook or fish hook. A jig head can be added, and the jig head can define a shaft of a hook, barbed hook or fish hook. The at least one lock arm can be configured to be releasably attached to the shaft of the hook, barbed hook or fish hook. The fish lure lock can further include a lure with an exterior surface.

The first lock arm can define at least one barb. The fish lure lock or lock body can define a second lock arm that is configured to releasably attach to a shaft of a hook, barbed hook or fish hook. The second lock arm can define at least one barb. The second lock arm can be offset longitudinally from the at least one lock arm. The lock body can be configured to receive an adjustable or elastic member, such as an O-ring. The lock body and the lure can individually or both engage an elastic member, such as an O-ring. The lock body can be configured to be positioned at least partially inside an inner surface of an elastic member, such as an O-ring. The lock body can further include a first pair of openings for receiving a first weed guard and a second pair of openings for receiving a second weed guard.

A bait lock can include a lock body and at least on lock arm configured to penetrate an exterior surface of bait and retain the bait onto a shaft of a barbed hook.

A bait lock can include a lock body, at least on lock arm configured to penetrate an exterior surface of bait and retain the bait onto a shaft of a barbed hook and at least one weed guard. An adjustable member can exert a compression force onto the lock body.

A bait lock kit can include a lock body that defines at least one anchor region configured to attach to jig head and at least one elastic member. The elastic member can be sized and shaped to circumscribe at least a portion of the lock body and exert a compression force onto the lock body to hold a lure or bait onto the jig head, a hook or a hook shaft. The lock body or bait lock or fish lure lock can further include at least one lock arm configured to penetrate through an exterior surface of a bait. The elastic member can also circumscribe at least a portion of a bait.

BRIEF DESCRIPTION OF THE DRAWINGS

Any feature or combination of features described herein are included within the scope of the present disclosure provided that the features included in any such combination are not mutually inconsistent as will be apparent from the context, this specification, and the knowledge of one of ordinary skill in the art. Additional advantages and aspects of the present disclosure are apparent in the following detailed description and claims, and the following drawings in which:

DETAILED DESCRIPTION

Figure 1:
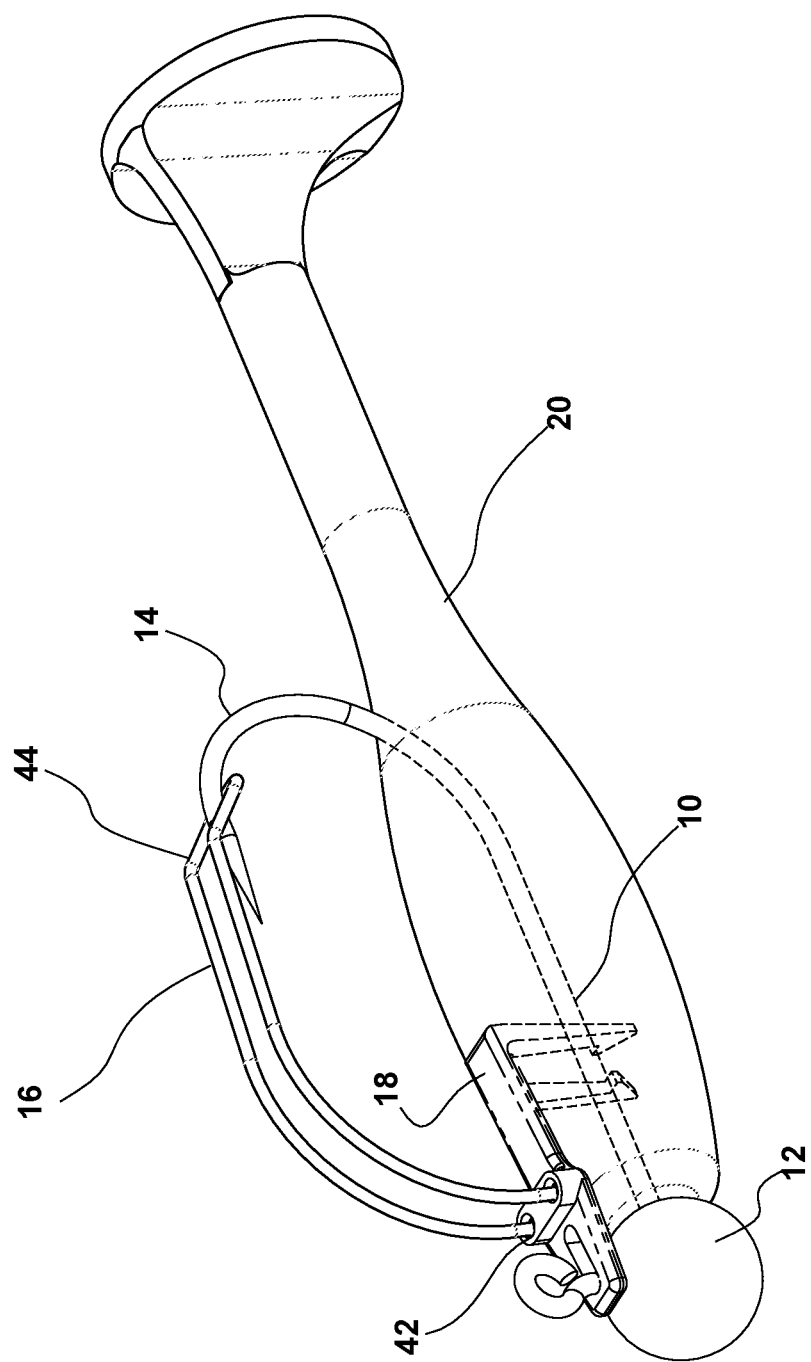
FIG. 1 is a perspective side view of a jig head, lure, weed guard, and a first embodiment fish lure lock.

FIG. 1 shows a jig head 10 that can carry an optional weed guard 16, a bait lock or fish lure lock 18, and live bait or artificial bait, such as a lure 20. The jig head 10 can include a fishing line attachment 12 and a hook, such as a barbed hook, a prey hook, a non-barred hook or fish hook 14. The fishing line attachment 12 can include a ball and an eyelet, just an eyelet, or any structure configured to retain a fishing filament or line (not shown). The jig head 10 can be made from metal, plastic, translucent plastic, plastic with a color that matches the lure 20, or any other suitable material. The fish hook 14 can be a hook, a barbed fish or prey hook or a non-barbed fish or prey hook. The fish hook 14 can be made from metal, plastic, translucent plastic, plastic with a color that matches the lure 20, or any other suitable material. The weed guard 16 can be removably or releasably attached to the fish lure lock 18, or the weed guard 16 can extend through holes in the fish lure lock 18. The weed guard 16 can be made from metal, wire, fishing line, filament, plastic, or other suitable material. The fish lure lock 18 can be removably or releasably attached to the fishing line attachment 12. The lure 20 can be any type of bait, such as plastic or synthetic material baits, which can be penetrated or frictionally retained by the fish lure lock 18. Penetration can be though an exterior surface of the lure 20 or through exterior and interior surfaces of the lure 20.

Figure 2:
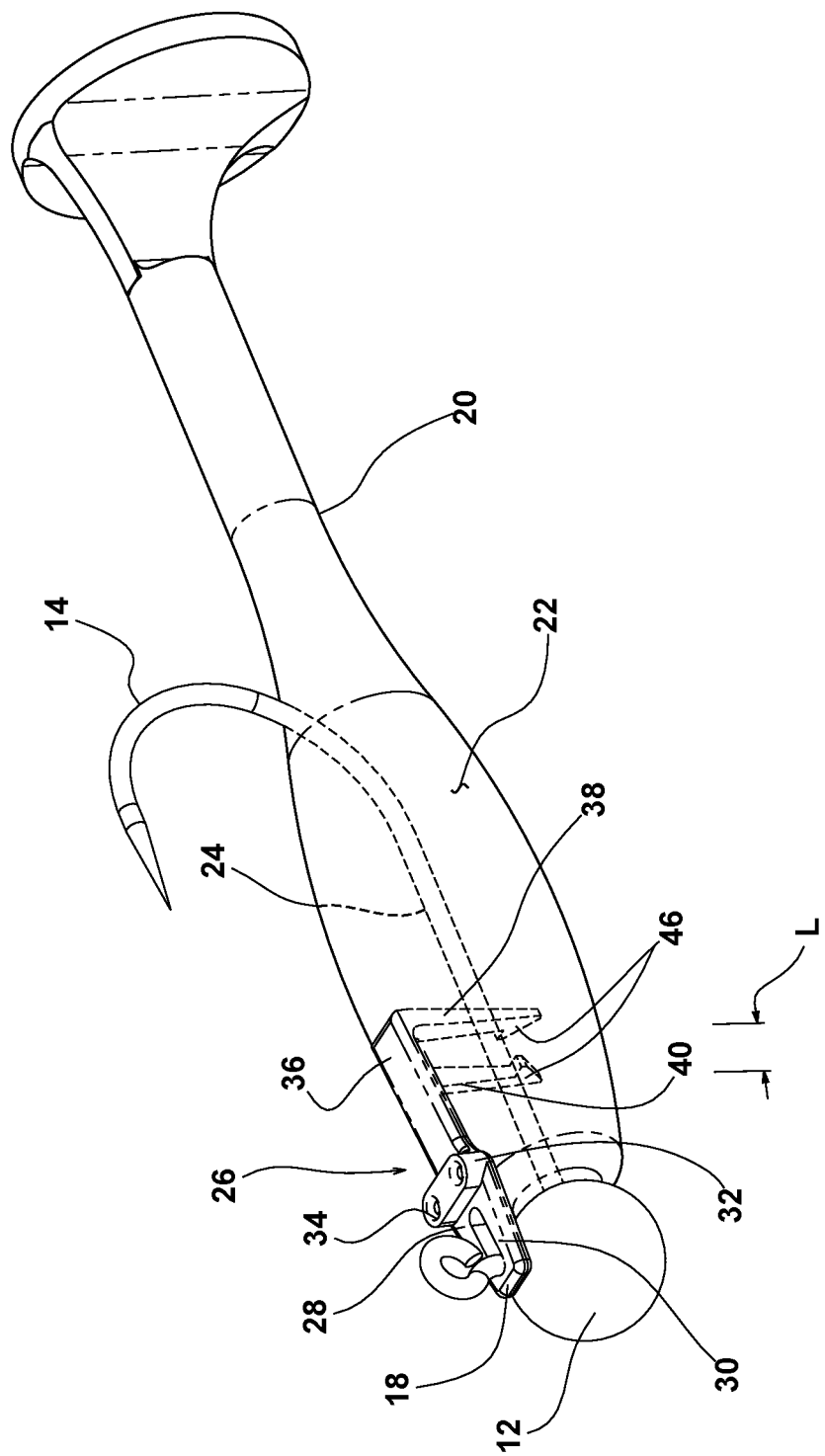
FIG. 2 is the view of FIG. 1, with the lure made transparent for clarity and the weed guard removed for clarity.

As shown in FIG. 2, the fish lure lock 18 can penetrate a body 22 of the lure 20 and attach to a shaft 24 of the fish hook 14. The fish lure lock 18 can include a lock body 26. The lock body 26 can include an anchor region 28, a slot 30 defined by the anchor region 28, an intermediate region 32 positioned proximate to the anchor region 28, one or more optional openings 34 defined by the intermediate region 32, an extension 36 positioned proximate to the intermediate region 32, a first lock arm 38 that extends from the extension 34, and a second lock arm 40 that extends from the extension 36. The first lock arm 38 and the second lock arm 40 can each extend in the same direction from the extension 34.

The anchor region 28 can be releasably attached to the fishing line attachment 12 or other portion of a jig head 10 via the slot 30. A portion of the anchor 28 region can extend through the slot 30. The optional one or more openings 34 in the intermediate region or other portions of the fish lure lock 18 can receive free ends 42 (FIG. 1) of the weed guard 16. The weed guard 16 free ends 42 can be removably or permanently attached to the optional one or more openings 34 of the fish lure lock 18 and a closed end 44 (FIG. 1) of the weed guard 16 can engage or be positioned adjacent to a sharp end of the fish hook 14, protecting the sharp end of the fish hook 14 from unwanted snags against debris or rocks. One or both of the first lock arm 38 and the second lock arm 40 can include none, one, two or more barbs 46. The barbs 46 can engage the shaft 24 of the fish hook 14, to releasably retain the fish lure lock 18 on the fish hook 14. The first lock arm 38 and the second lock arm 40 can each be offset along a length L of the extension 36.

Figure 3:
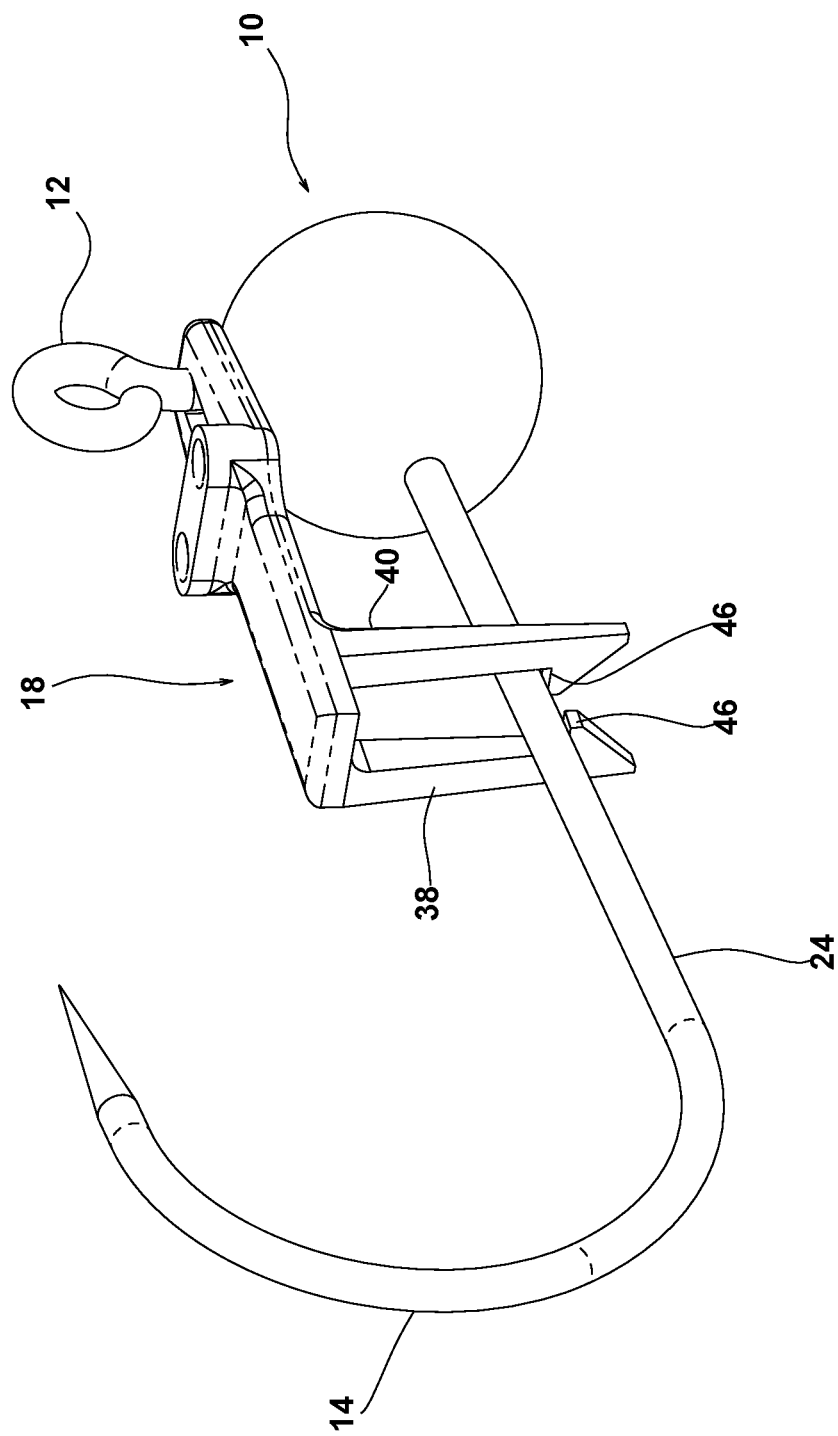
FIG. 3 is a perspective view of a jig head and the fish lure lock shown in FIGS. 1 and 2.

FIG. 3 shows a jig head 10, which can include a fishing line attachment 12 and a hook, barbed hook open fish hook 14, and the first embodiment fish lure lock 18 shown in FIGS. 1 and 2. The fish lure lock 18 is removably attached to the fishing line attachment 12 and to the shaft 24 of a fish hook 12. This first embodiment fish lure lock 18 has two barbs 46, one on each of the first lock arm 38 and the second lock arm 40. The barbs 46 keep the fish lure lock 18 releasably, removably and reusably attached to the shaft 24 of the fish hook 12.

Figure 4:
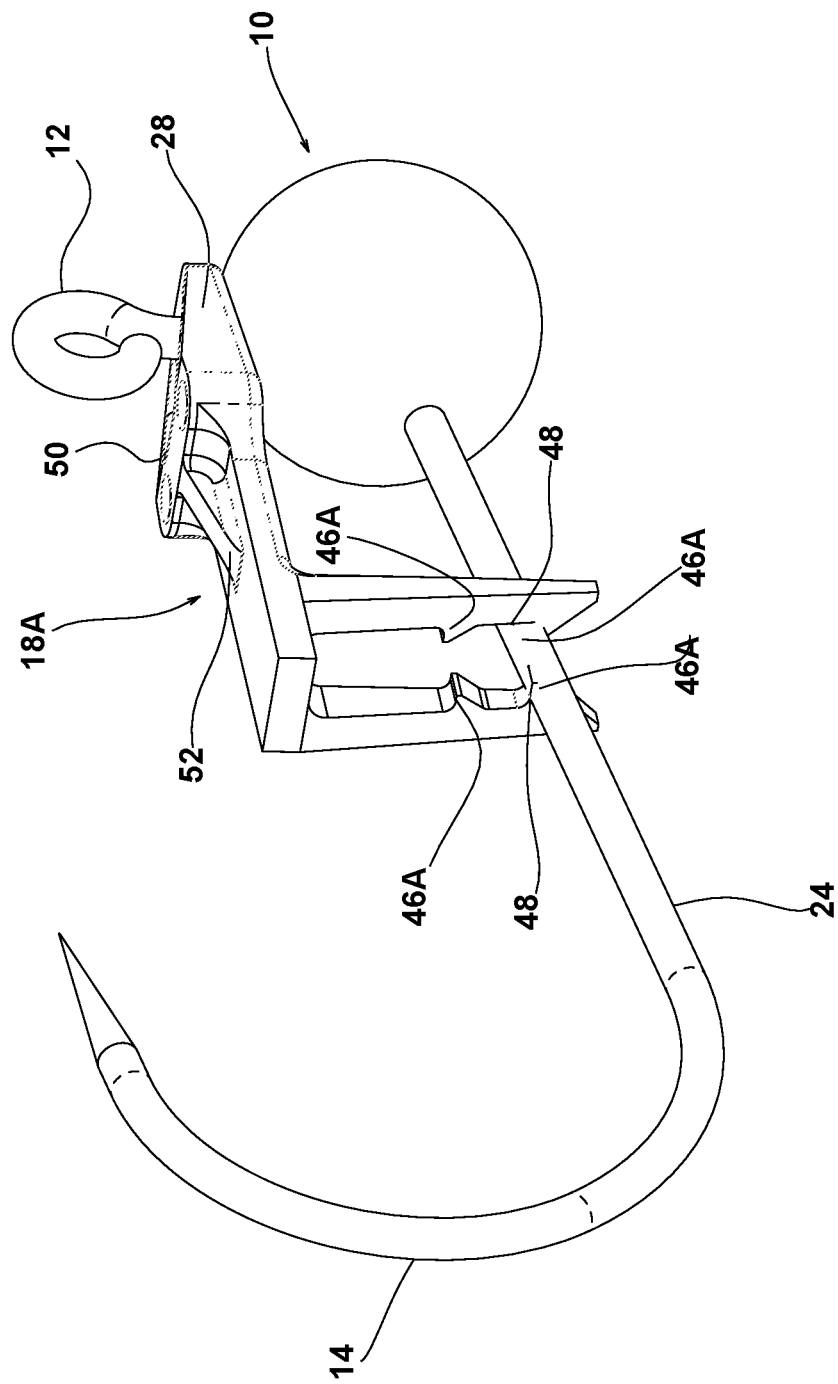
FIG. 4 is a perspective view of the jig head shown in FIGS. 1-3 and a second embodiment fish lure lock.

FIG. 4 shows a jig head 10 and a second embodiment fish lure lock 18A. The fish lure lock 18A is removably attached to the fishing line attachment 12 and to the shaft 24 of a fish hook 14. The second embodiment fish lure lock 18A can include two or more barbs 46A on each of the first lock arm 38A and the second lock arm 40A. The shaft 24 of the fish hook 14 is received in first recesses 48 defined between a first set of barbs 46A on the first lock arm 38 and a first set of barbs 46A on the second lock arm 40A. The fish lure lock 18A can also include a ramped surface 50 defined by the anchor region 28 and a reinforcement rib 52.

Figure 5:
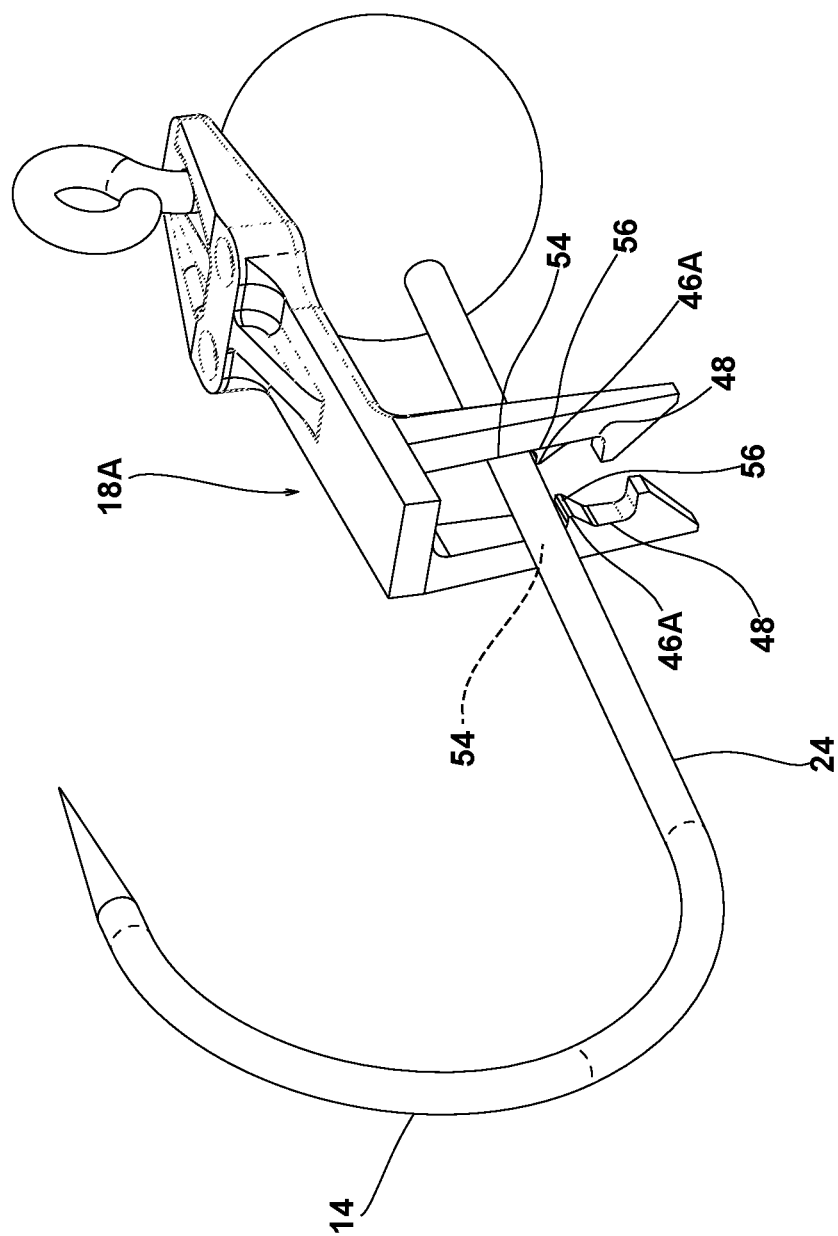
FIG. 5 is a perspective view of the jig head shown in FIGS. 1-4 and the second embodiment fish lure lock shown in FIG. 4.

FIG. 5 shows the fish lure lock 18A of FIG. 4, except that the shaft 24 of the fish hook 14 is received in second recesses 54 defined by ledges 56 of barbs 46A. The first recesses 48 and the second recesses 54 can be used for lures or other bait having two different outer diameters. The first recesses 48 can be used with lures or bait having a first outer diameter and the second recesses 54 can be used with lures or bait having a second outer diameter, wherein the first diameter is greater than the second outer diameter.

Figure 6:
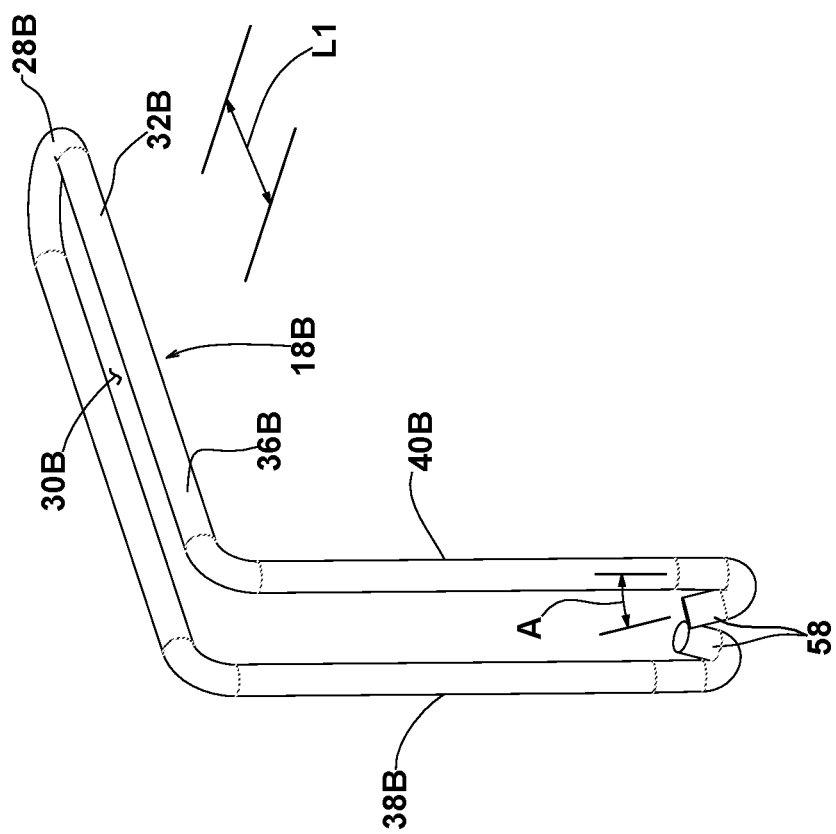
FIG. 6 is a perspective view of a third embodiment fish lure lock.

FIG. 6 is a third embodiment fish lure lock 18B made from a formed metal wire, molded plastic, or both. The fish lure lock 18B can include an anchor region 28B, an intermediate region 32B, and extension 36B, a first lock arm 38B and a second lock arm 40B. A slot 30B can extend through the anchor region 28B, the intermediate region 32B, the extension 36B, the first lock arm 38B and the second lock arm 40B. The first lock arm 38C and the second lock arm 40C can terminate in upturned ends 58. Each of the upturned ends 58 can be canted toward one another and away from the first lock arm 38C and the second lock arm 40B at a 45 degree angle A. Any angle A less than 180 degrees is preferred, or any angle that permits the upturned ends 58 to penetrate a lure or other bait. The upturned ends 58 can also catch around a shaft 24 of a fish hook 14. Slot 30B can engage a fishing line attachment 12. Alternatively, the first lock arm 38B and second lock arm 40B can be offset along a second length L1 of the extension 36B.

Figure 7:
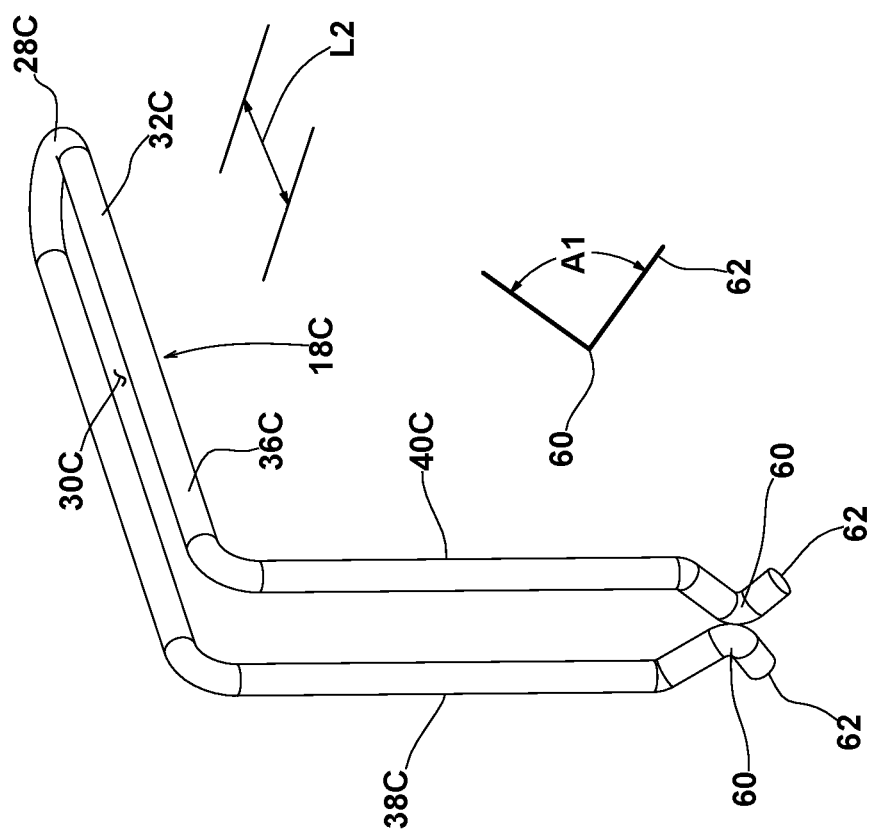
FIG. 7 is a perspective view of a fourth embodiment fish lure lock.

FIG. 7 is a fourth embodiment fish lure lock 18C made from a formed metal wire, molded plastic, or both. The fish lure lock 18C can include an anchor region 28C, an intermediate region 32C, an extension 36C, a first lock arm 38C and a second lock arm 40C. A slot 30C can extend through the anchor region 28C, the intermediate region 32C, the extension 36C, the first lock arm 38C and the second lock arm 40C. The first lock arm 38C and the second lock arm 40C can terminate in mirror-image or offset convex portions 60. The convex portions 60 can converge toward each other.

Ends 62 adjacent to the convex portions 60 can puncture a lure or other bait, the convex portions 60 can attach to a shaft of a fish hook, and the slot 30C can attach to a fishing line attachment 12. Alternatively, the first lock arm 38C and second lock arm 40C can be offset along a third length L2 of the extension 36C. Ends 62 can form an angle A1 at convex portions 60, the angle being approximately 45 degrees to 135 degrees.

Figure 8:
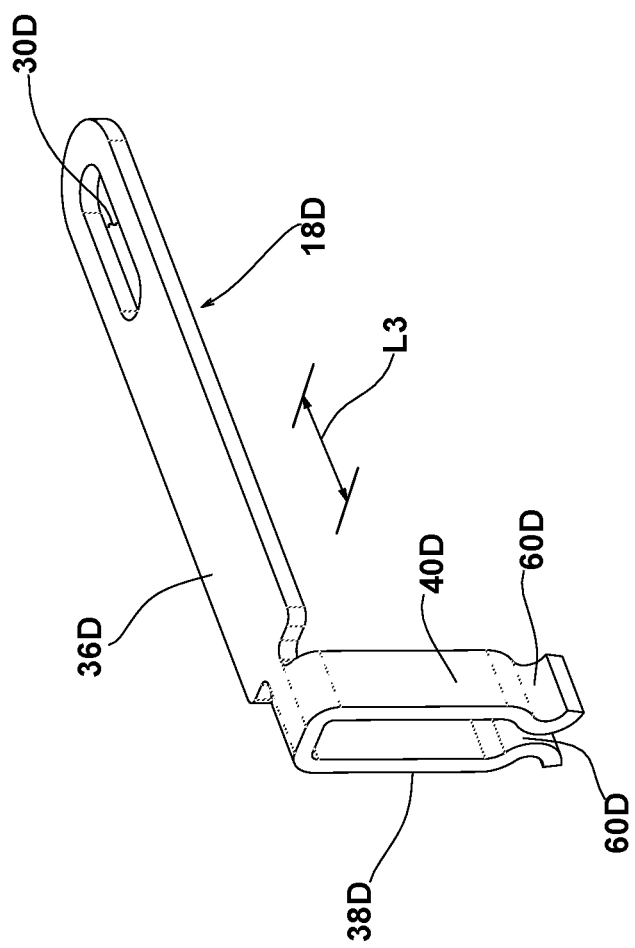
FIG. 8 is a perspective view of a fifth embodiment fish lure lock.

FIG. 8 is a fifth embodiment fish lure lock 18D made from a metal stamping, formed plastic, or both. First lock arm 38D and second lock arm 38D each define mirror-image convex portions 60D that converge toward each other. The convex portions 60D can attach to a shaft 24 of a fish hook 14, and a slot 30D can attach to a fishing line attachment 12. Alternatively, the first lock arm 38D and second lock arm 40D can be offset along a fourth length L3 of the extension 36D.

Figure 9:
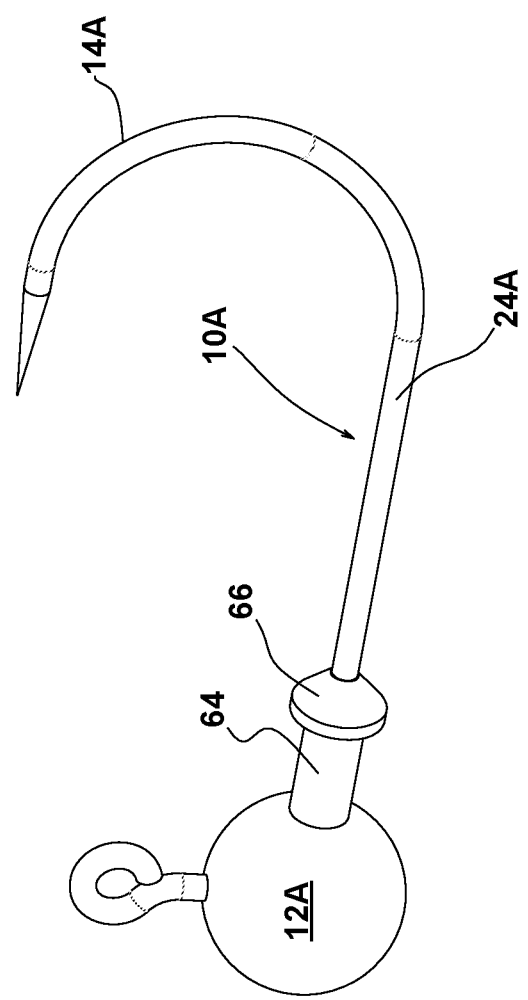
FIG. 9 is perspective side view of a second embodiment jig head.

FIG. 9 shows a jig head 10A that defines an elastic member surface 64 positioned proximate to the fishing line attachment 12A, such as between the fishing line attachment 12A and the shaft 24A of the fish hook 14A. A stopper 66 can be positioned between the elastic member surface 64 and the shaft 24A.

Figure 10:
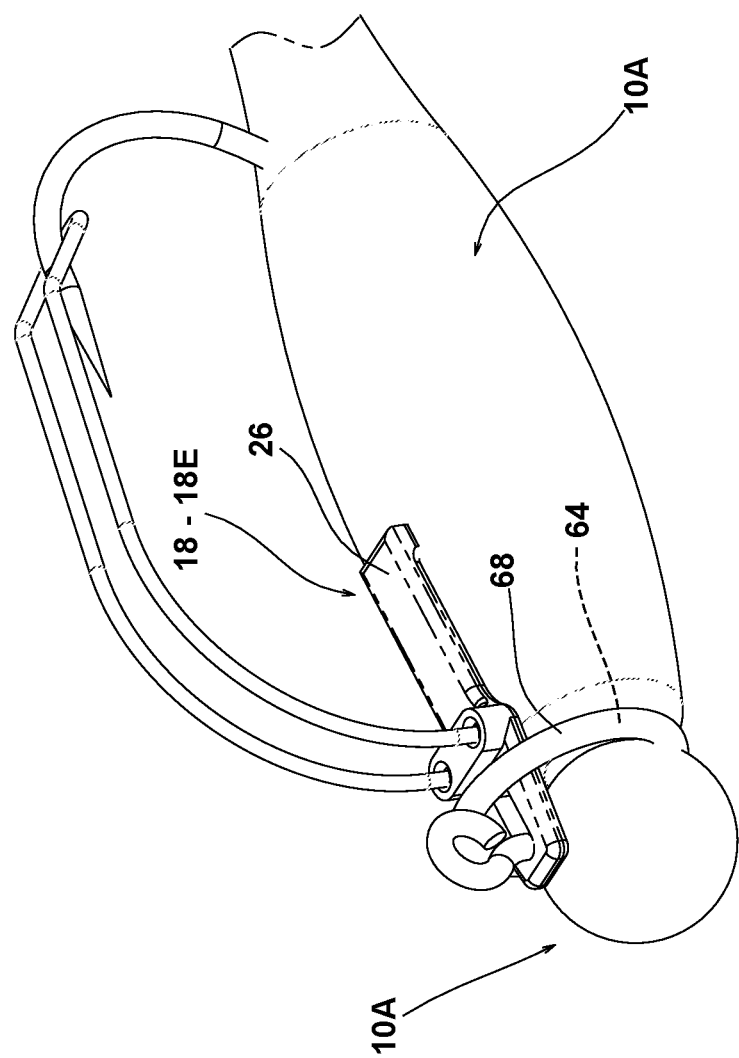
FIG. 10 is a perspective view of the jig head shown in FIG. 9 attached to a lure and fish lure lock.
Figure 11:
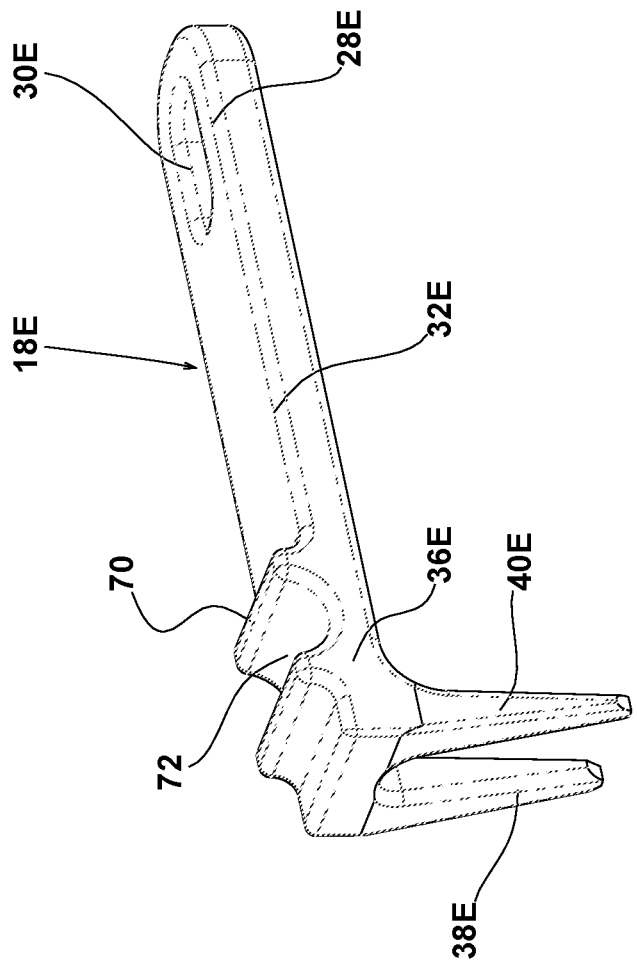
FIG. 11 is a perspective view of a sixth embodiment fish lure lock.

FIG. 10 shows an adjustable or compression or elastic member 68, such as an O-ring, can engage the elastic member surface 64 of jig head 10A and any of the fish lure locks 18, 18A, 18B, 18C, 18D, 18E (FIG. 11). The elastic member 68 can be sized and shaped to circumscribe at least a portion of the lock body 26 or at least a portion of any one of the respective fish lure locks 18A-18E, and exert a compression force onto the lock body 26 or fish lure lock 18A-18E. The elastic member 68 can be sized and shaped to circumscribe at least an outer portion of the lock body 26 or at least an outer portion of any one of the respective fish lure locks 18A-18E, and exert a compression force onto the lock body 26 or fish lure lock 18A-18E. The elastic member 68 can be sized and shaped to circumscribe at least a portion of the jig head 10A.

FIG. 11 shows a sixth embodiment fish lure lock 18E that can include an anchor region 28E, a slot 28E, an intermediate portion 32E, an extension 36E a first lock arm 38E and a second lock arm 40E. The extension 36E, or alternatively the intermediate portion 32E, can define at least on ridge 70 or at least one trough 72. The first lock arm 38E and the second lock arm 40E can be devoid of barbs, but can penetrate an exterior surface of a lure 20.

Figure 12:
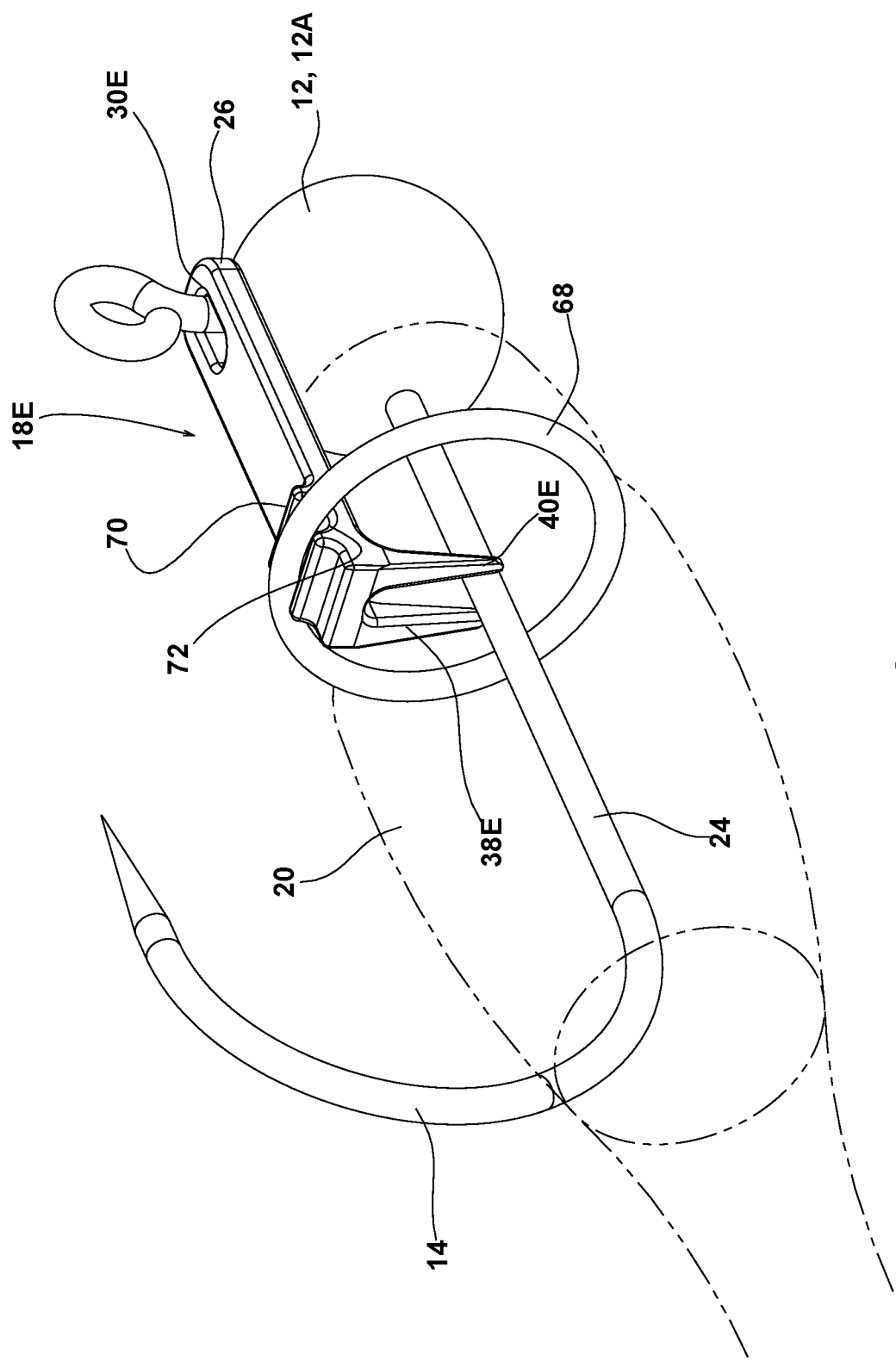
FIG. 12 is a perspective side view of the sixth embodiment fish lure lock shown in FIG. 11, a jig head and a lure made transparent for clarity.

As shown in FIG. 12, the at least one trough 72 can receive an adjustable or compression or elastic member 68. With or without the at least one trough 72, the elastic member 68 can be sized and shaped to circumscribe at least a portion of lock body 26 or fish lure lock 18E and exert a compression force onto the lock body 26 or fish lure lock 18E. With or without the at least one trough 72, the elastic member 68 can be sized and shaped to circumscribe at least an outer portion of lock body 26 or an outer portion fish lure lock 18E and exert a compression force onto the lock body 26 or fish lure lock 18E. The elastic member 68 can also wrap around at least a portion of an exterior surface of a lure 20 or other bait. At least one ridge 70 can be a pair of space apart ridges that help prevent the adjustable member 68 from dislodging from the fish lure lock 18E and the lure 20. Slot 30E can receive the fishing line attachment 12, 12A. At least one lock arm 38E, 40E can be configured to penetrate through an exterior surface of a lure 20 or other bait.

Alternatively, the lock body 26 or any of the fish lure locks 18A-18E described herein can define nubs or a textured surface that frictionally engage an exterior surface of a lure 20 or other bait but to not puncture the exterior surface of the lure 20 or bait. In another alternative, the first and second lock arms 38E, 40E can penetrate an exterior surface of the lure 20 or bait, but not engage the shaft 24 of the fish hook 14.

Figure 13:
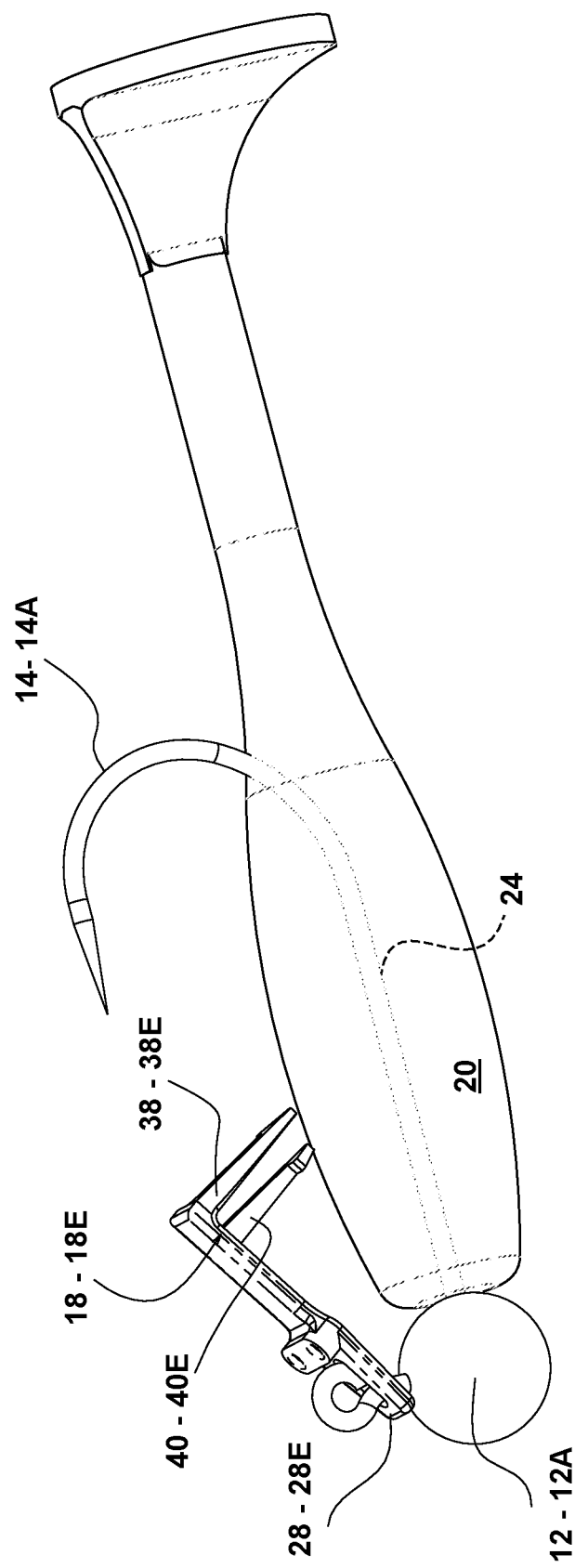
FIG. 13 is a perspective side view of a lure being penetrated by any of the fish lure locks shown in FIGS. 1-12.
Figure 14:
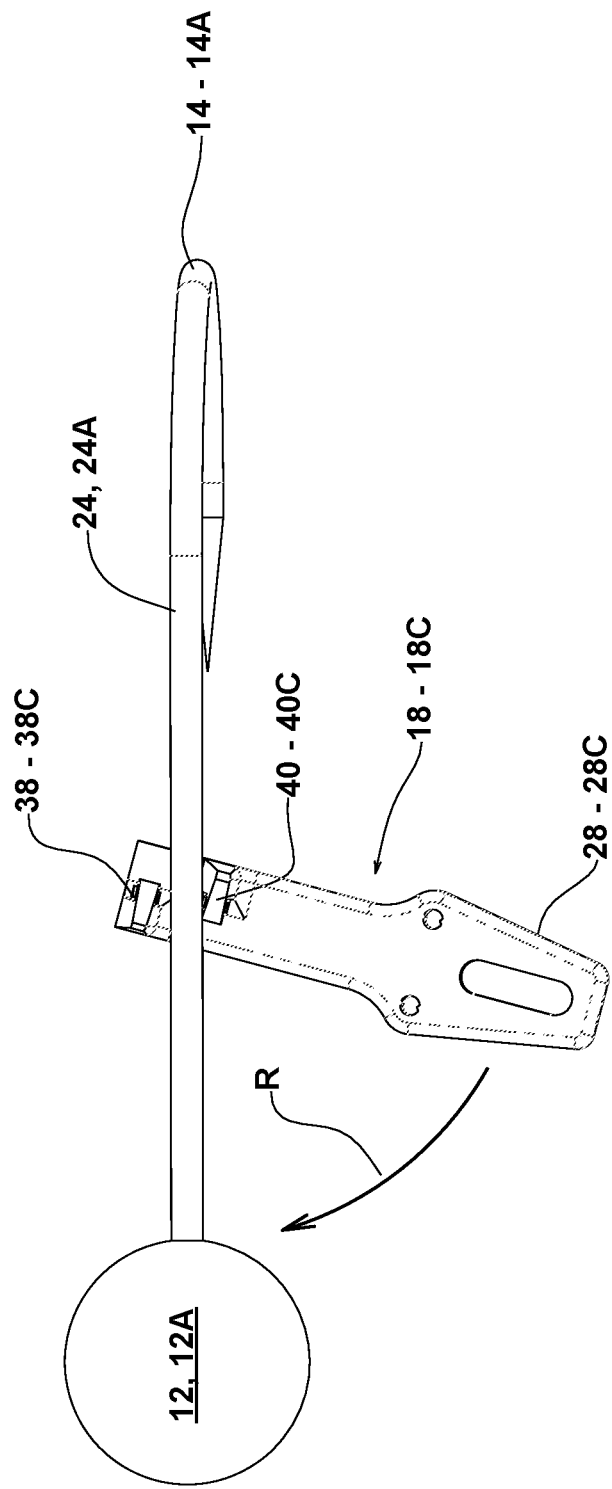
FIG. 14 is a bottom view of the jig head shown in FIGS. 1-5 with a partially attached fish lure lock shown in FIGS. 1-5.

As shown in FIG. 13, any of the fish lure locks 18-18E can be removably and pivotally attached to the fishing line attachment 12, 12A. The slot 30-30E can engage the fishing line attachment 12, 12A. The fish lure lock 18-18E is pivoted toward the lure 20. The first lock arm 38-38E and the second lock arm 40-40E are pressed into the lure 20. Alternatively, as shown in FIG. 14, the first lock arm 38-38C and the second lock arm 40-40C are first pressed into the lure 20 (FIG. 13). The first lock arm 38-38C and the second lock arm 40-40C releasably connect to the shaft 24 of the hook 14. The anchor region 28-28C of the fish lure lock 18-18C is then rotated toward the fishing line attachment 12, 12A and releasably attached to the fishing line attachment 12, 12A. The first lock arm 38-38C and the second lock arm 40-40C flex as the fish lure lock 18-18C is rotated in direction R, creating a spring retention force. When the anchor region 28-28C is attached to the fishing line attachment 12, 12A, the fish lure lock 18-18C exerts a force on the fishing line attachment 12, 12A, which retains the fish lure lock 18-18C on the fishing line attachment 12, 12A and the shaft 24, 24A of the fish hook 14, 14A.

With reference to all of the Figs. and disclosure herein, the fish lure lock 18-18E penetrates into the body 22 of the lure 20, preferably where the lure 20 has a larger cross-sectional diameter and its highest mechanical strength. First lock arms 38-38D and second lock arms 40-40D can have hook snaps or barbs 46 that allow the first lock arms 38-38D and second lock arms 40-40D to rotate out and around the shaft 24 of the fish hook 14 and then back into location. This keeps the first lock arms 38-38D and the second lock arms 40-40D secured inside the lure 20. The fish lure lock 18-18F helps prevent the lure 20 from sliding or moving longitudinally along the shaft 24 of the fish hook 14, allowing a fisherman to use the same lure 20 for a much longer period of time or use fewer lures over time.

Figure 16:
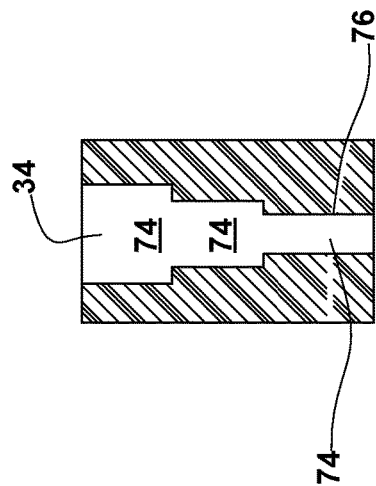
FIG. 16 is a cross-sectional view of another opening.
Figure 15:
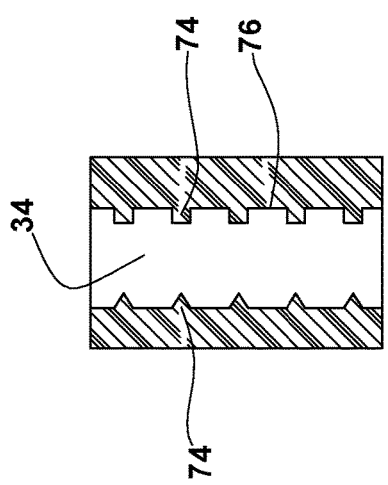
FIG. 15 is a cross-sectional view of an opening.

As shown in FIGS. 15 and 16, the at least one or more of openings 34 can, individually or in groups or pairs, have retention features 74 defined by inner walls 76 of each of the one or more openings 34. The retention features 74 are configured to releasably or permanently grab, frictionally retain, or otherwise secure a weed guard to the fish lure lock. At least one, two, three, four or more of the at least one or more openings 34 can have a decreasing tapered or stepped inner diameter retention feature that receives and permanently or releasably grabs, frictionally retains, or secures free ends 42 (FIG. 1) of a weed guard 16. The weed guard 16 (FIG. 1) can be made from materials having different material thicknesses, different outer diameters or different materials.

Figure 17:
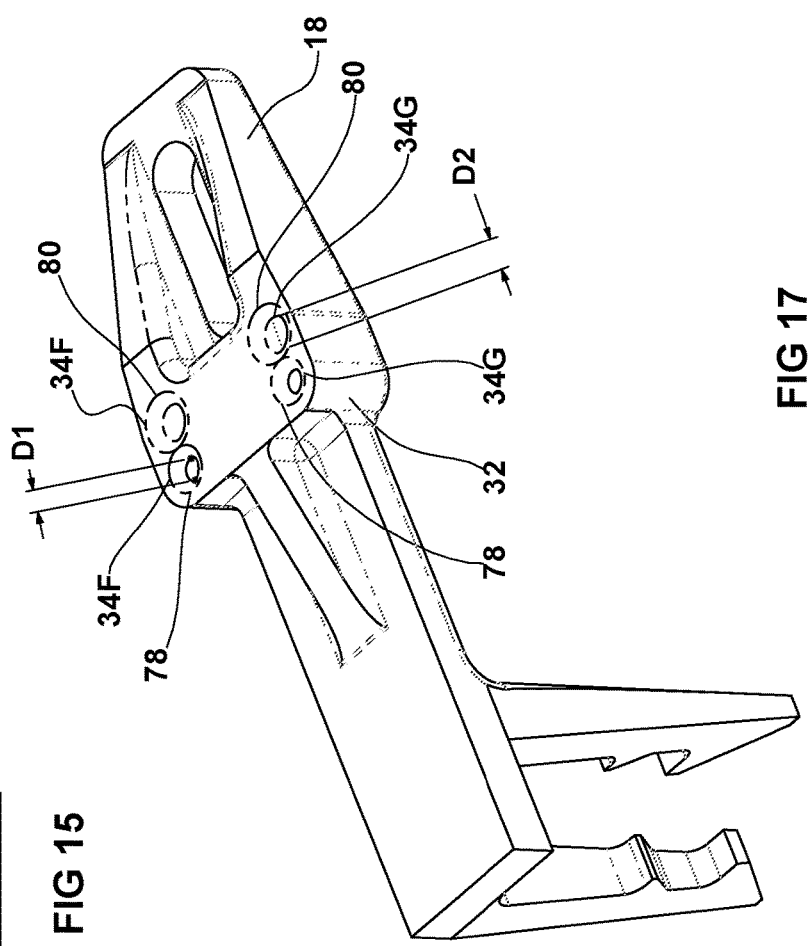
FIG. 17 is a perspective side view of fish lure lock with multiple pairs of openings.

As shown in FIG. 17, the one or more openings 34 can be multiple pairs of openings 34F, 34G defined on any of the fish lure locks described herein, such as the intermediate region of the fish lure lock. For example, fish lure lock 18B in FIG. 6 can have a bar (not shown) that spans two parallel sides of the intermediate region 32B or the extension 36B and defines one or more openings 34. Referring again to FIG. 17, each pair of openings 78, 80 in the multiple pairs of openings can have different internal diameters D1, D2, which allows different weed guard 16 free ends 42 (FIG. 1) with different material thicknesses or diameters to be releasably or permanently attached to the same fish lure lock 18. Stated another way, the fish lure lock 18 can define a first pair of openings 78 and a second pair of openings 80. Each opening 34F, 34G in the first pair of openings 78 can define a first internal diameter D1. The second pair of openings 80 may be positioned immediately adjacent to or near the first pair of openings 78. Each opening 34F, 34G in the second pair of openings 80 can define a second internal diameter D2 that is different from the first internal diameter D1. A third pair of openings (not shown), positioned adjacent to the first pair of openings 78 and the second pair of openings 80 can each define a third internal diameter D3 that is different from the first internal diameter D1 and the second internal diameter D3. Four or more pairs of openings can be added, as desired. Alternatively, at least one opening 34F in any one for the first pair of openings 78, the second pair of openings 80, and the third pair of openings (not shown) can have an inner diameter that is not equal to the inner diameter of another opening 34G in the same pair of openings 78, 80.

Referring again to FIG. 1, depending on which weed guard 16 material is selected, differing weed guard 16 material thicknesses or diameters can result in differing weed guard 16 stiffnesses. Stiffness of the weed guard 16 can be changed by changing the weed lock 16 material, combining weed guards 16 together, physically separating two combined weed guards 16, mixing weed guards 16 having different material thicknesses or diameters, separating combined weed guards 16 that each have different material thicknesses or diameters, substituting weed guards 16 having different material thicknesses or diameters on the fish lure lock 18, etc. or any combination thereof. Each weed guard 16 can be malleable or rigid and can be secured to the fish lure lock without adhesives or with adhesives, such as fast drying glue, glue, epoxy, or other suitable material. Adhesives can be water insoluble.

The foregoing description is provided for the purpose of explanation and is not to be construed as limiting the invention. While various embodiments have been described with reference to preferred embodiments or preferred methods, it is understood that the words which have been used herein are words of description and illustration, rather than words of limitation. Furthermore, although the embodiments have been described herein with reference to particular structure, methods, and embodiments, the invention is not intended to be limited to the particulars disclosed herein. For instance, it should be appreciated that structure and methods described in association with one embodiment are equally applicable to all other embodiments described herein unless otherwise indicated. For example, fish is only descriptive. The present invention is not limited to catching only fish, as creatures besides fish can be caught using bait or a lure attached to a hook.

Those skilled in the relevant art, having the benefit of the teachings of this specification, may effect numerous modifications to the invention as described herein, and changes may be made without departing from the spirit and scope of the invention, for instance as set forth by the appended claims.

I claim:

1. A fish lure lock comprising:
   a lock body that defines an anchor region configured to be attached to a ball of a jig head and the lock body further defines an extension spaced from the anchor region; and
   at least one lock arm positioned on the extension, wherein the at least one lock arm is configured to penetrate through an exterior surface of a lure and is further configured to be releasably and directly attached to a shaft of a hook, such that the lure is retained on the shaft of the hook.

2. The fish lure lock of claim 1 further comprising a slot defined by the anchor region, an intermediate portion positioned proximate to the anchor region, at least one opening defined by the intermediate portion, and a weed guard received in the at least one opening.

3. The fish lure lock of claim 1 wherein the at least one lock arm is configured to be repeatedly attached to and removed from the shaft of the hook.

4. The fish lure lock of claim 1 wherein the jig head comprises the shaft of the hook.

5. The fish lure lock of claim 1 wherein the lure comprises an exterior surface.

6. The fish lure lock of claim 1 wherein the at least one lock arm defines at least one barb.

7. The fish lure lock of claim 1 wherein the lock body is configured to receive an elastic member.

8. The fish lure lock of claim 1 wherein the lock body and the lure both receive an elastic member.

9. The fish lure lock of claim 1 wherein the lock body is configured to be positioned at least partially inside of an elastic member.

10. The fishing lure lock of claim 1 wherein the lock body further comprises:
    a first pair of openings for receiving a first weed guard; and
    a second pair of openings for receiving a second weed guard.

11. The fishing lure lock of claim 1 wherein the fish lure lock further comprises a ramped surface defined by the anchor region.

12. A fish lure lock of claim 1 wherein the anchor region defines a slot.

13. The fish lure lock of claim 12 wherein the slot is configured to receive an eyelet of the jig head.

14. The fish lure lock of claim 1 further comprising a second lock arm also positioned on the extension, wherein the second lock arm is configured to releasably attach to the shaft of the hook.

15. The fish lure lock of claim 14 wherein the second lock arm defines at least one barb.

16. The fish lure lock of claim 14 wherein the second lock arm is offset longitudinally from the at least one lock arm.

17. A bait lock kit comprising:
    the fishing lure lock of claim 1; and
    at least one elastic member,
    wherein the elastic member is sized and shaped to circumscribe at least a portion of the lock body and exert a compression force onto the lock body.

18. The bait lock kit of claim 17 wherein the elastic member circumscribes at least a portion of the lure.

* * * * *